United States Patent [19]

Simpson

[11] Patent Number: 4,602,468
[45] Date of Patent: Jul. 29, 1986

[54] ROOF CLIP ASSEMBLY FOR A ROOF SYSTEM

[75] Inventor: Harold G. Simpson, Oklahoma City, Okla.

[73] Assignee: Harold Simpson, Inc., Oklahoma City, Okla.

[21] Appl. No.: 428,568

[22] Filed: Sep. 30, 1982

Related U.S. Application Data

[63] Continuation-in-part of Ser. No. 306,662, Sep. 29, 1981, Pat. No. 4,524,554, and a continuation-in-part of Ser. No. 121,920, Feb. 15, 1980, Pat. No. 4,361,993, which is a continuation-in-part of Ser. No. 93,173, Nov. 13, 1979, Pat. No. 4,329,823.

[51] Int. Cl.$^4$ ............................................. E04B 5/00
[52] U.S. Cl. ...................................... 52/410; 52/478; 52/222; 52/715
[58] Field of Search ................. 52/478, 408, 410, 222, 52/90, 714, 715, 520, 545, 508, 713, 404, 407, 480, 483, 262, 92

[56] References Cited

U.S. PATENT DOCUMENTS

| | | | |
|---|---|---|---|
| 2,590,687 | 3/1952 | Crafton | 52/404 X |
| 3,064,772 | 11/1962 | Clay | 52/404 X |
| 3,389,512 | 6/1968 | Sarlo et al. | 52/92 X |
| 3,394,516 | 7/1968 | Taylor et al. | 52/483 X |
| 3,474,583 | 10/1969 | Manias | 52/404 X |
| 4,120,122 | 10/1978 | Bahr | 52/715 X |
| 4,139,974 | 2/1979 | Fox | 52/478 X |
| 4,248,021 | 2/1981 | Dyer | 52/404 |
| 4,269,012 | 5/1981 | Mattingly et al. | 52/520 X |

FOREIGN PATENT DOCUMENTS 154549 7/1903 Fed. Rep. of Germany ........ 52/478

Primary Examiner—Carl D. Friedman
Attorney, Agent, or Firm—Bill D. McCarthy

[57] ABSTRACT

An improved building assembly in which a flexible membrane is employed as a stabilization element for secondary structural members. The building assembly is also provided with a plurality of tertiary support assemblies and an improved bracing system for selected tertiary support assemblies to minimize or prevent failures of the tertiary structural assemblies due to the translational and rotational movement of the tertiary structural assemblies as a load is applied thereto, while at the same time other tertiary structural assemblies connected to other elements of the roof move in unison with the roof as the roof changes shape because if expansion and contraction or other forces. An improved roof structural bracing system for interconnecting the wall of the building via a wall connector to a primary support beam so as to minimize or prevent failures of the wall connector due to translational and rotational movement of the wall connector as a load is applied thereto.

39 Claims, 19 Drawing Figures

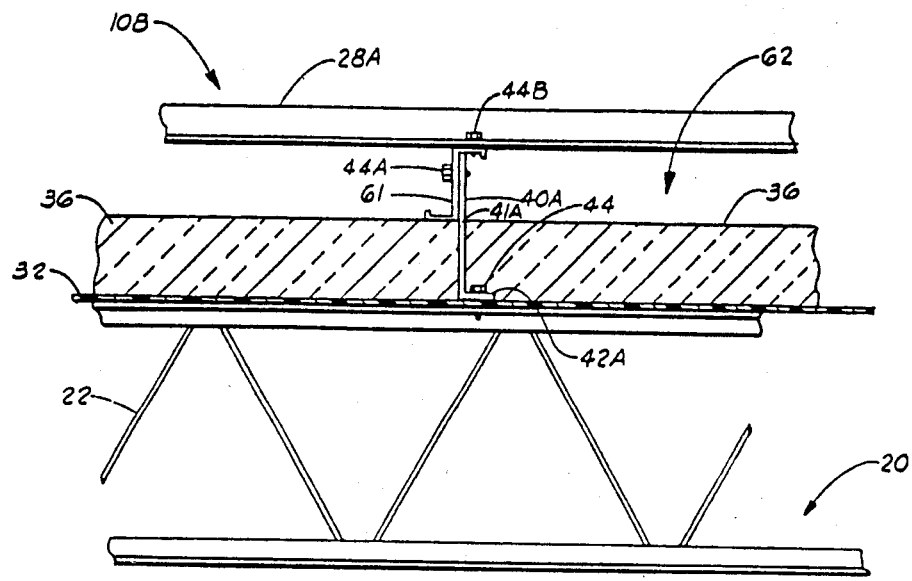
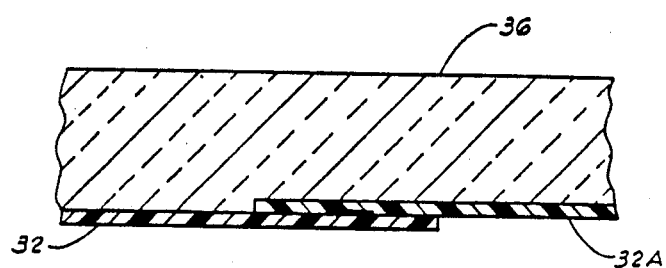
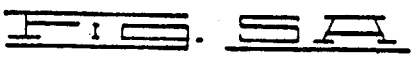
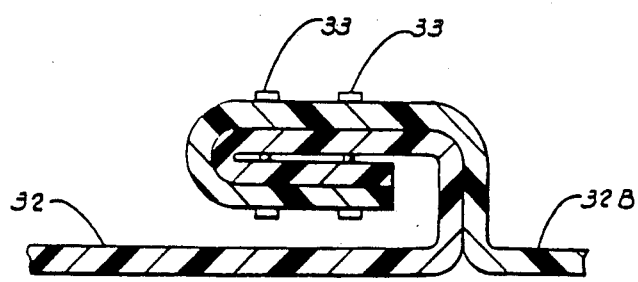
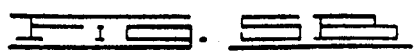

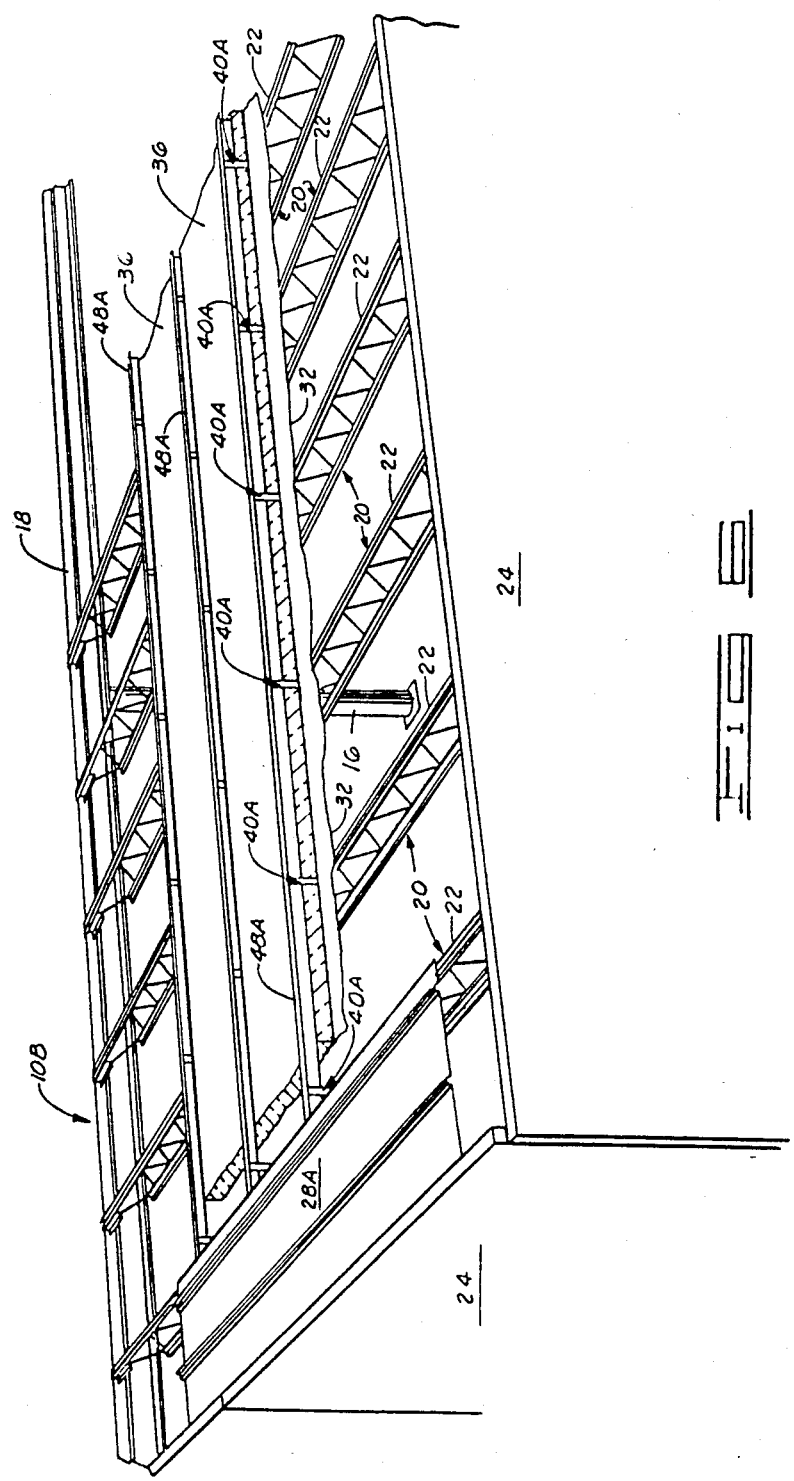

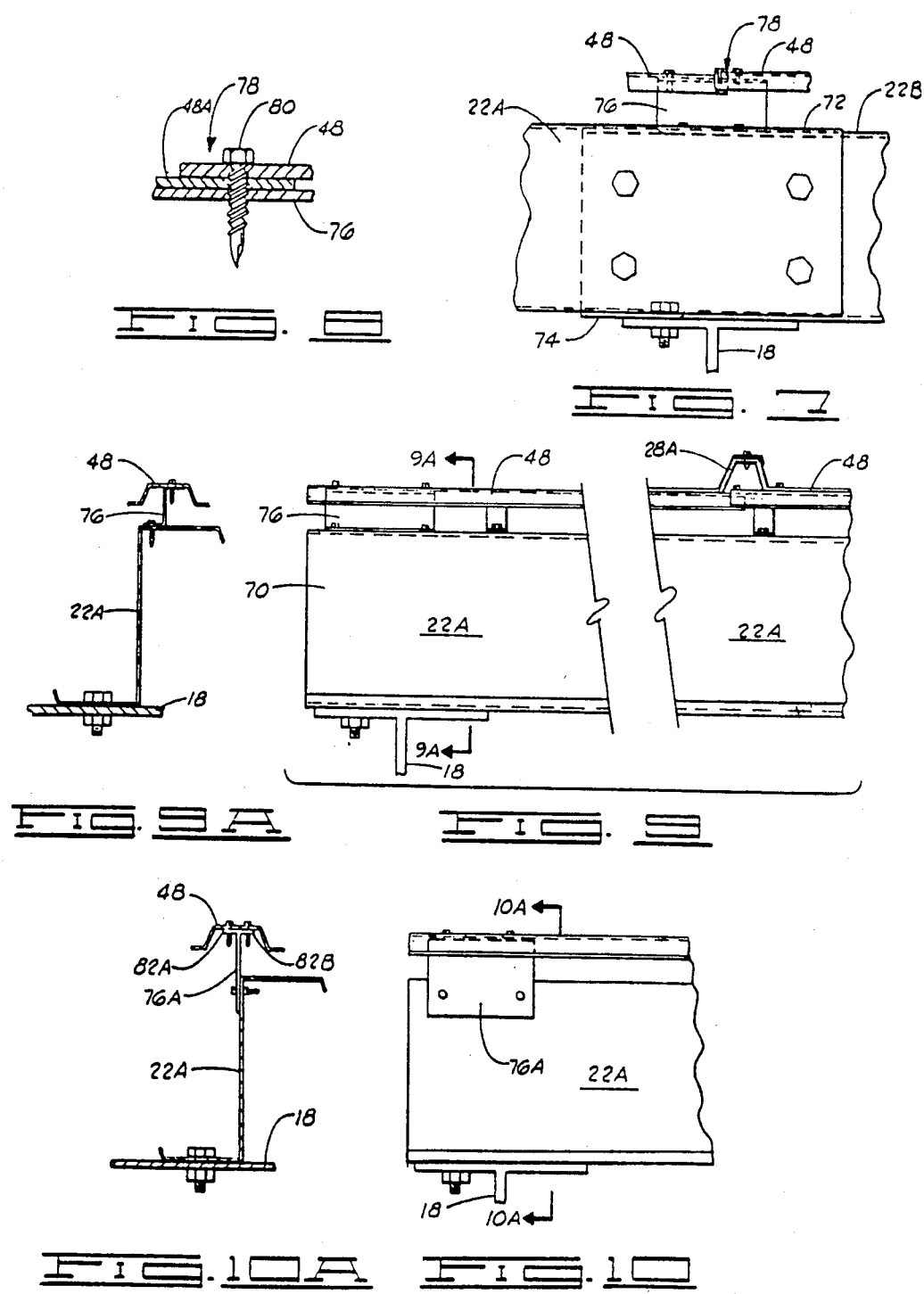

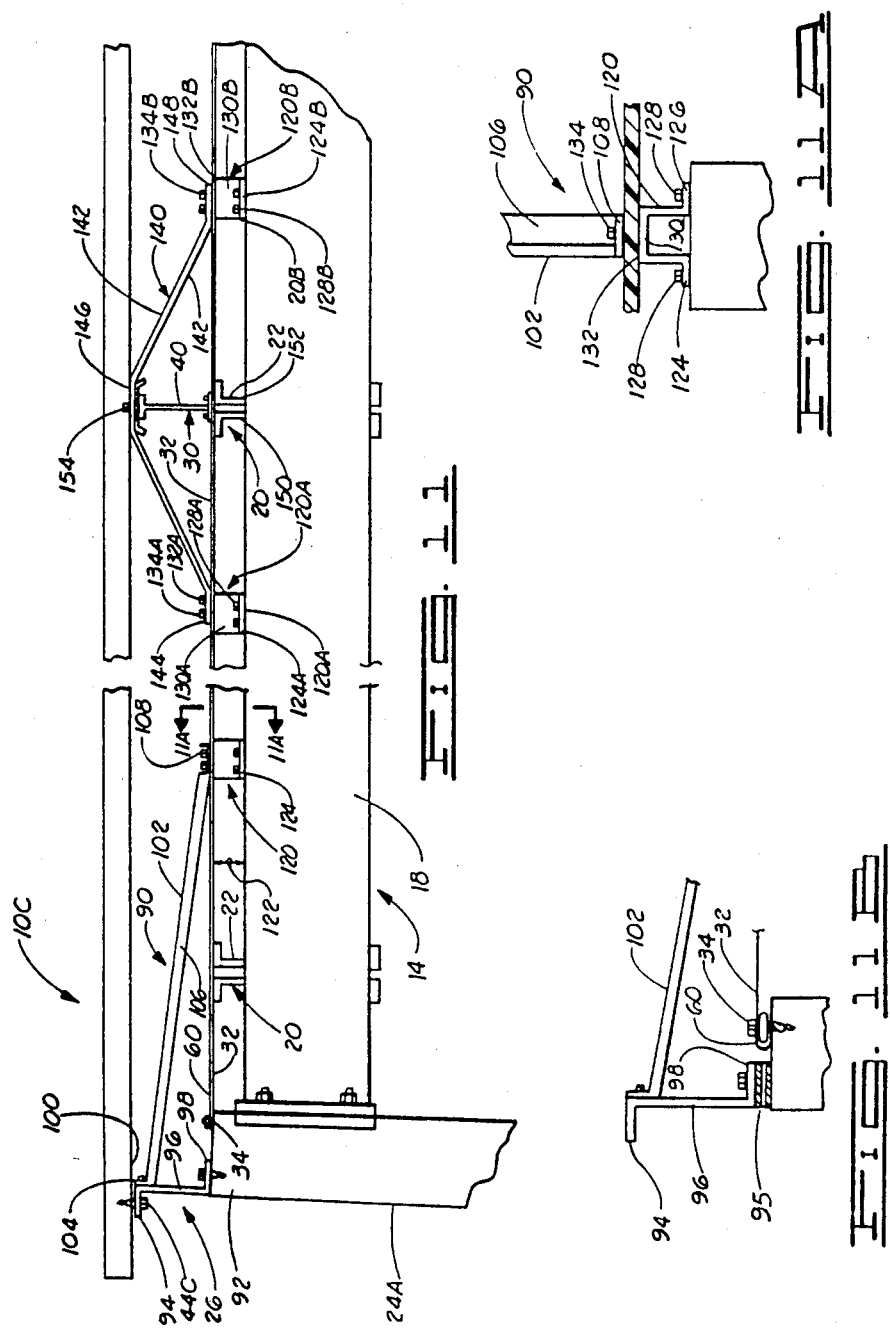

ROOF CLIP ASSEMBLY FOR A ROOF SYSTEM

CROSS REFERENCE TO RELATED APPLICATION

This is a continuation-in-part application to a U.S. patent application entitled "Structural Bracing System," Application No. 306,662, filed Sept. 29, 1981, now U.S. Pat. No. 4,524,554 and to a U.S. patent application entitled "Frameless Enclosure," Application No. 121,920, filed Feb. 15, 1980, and now U.S. Pat. No. 4,361,993 each of which is a continuation-in-part to a U.S. patent application No. 093,173, filed Nov. 13, 1979, and now U.S. Pat. No. 4,329,823.

BACKGROUND OF THE INVENTION

1. Field of the Invention

The present invention relates generally to the field of improving the heat transfer resistance and structural stability of a roof system in which insulation material is confined between construction members, and more particularly but not by way of limitation, to an insulated roof system which provides improved insulation qualities to a pre-engineered building and the like. In one aspect the present invention relates to an insulated roof system of a pre-engineered building having panel support assemblies supported by underlying primary structural members, and more particularly, but not by way of limitation, to bracing apparatus and methods for stabilizing panel support assemblies to minimize or prevent structural failures.

2. Discussion of Prior Art

The pre-engineered building industry has developed into a very large segment of the building construction industry in the United States, and it has experienced an increasingly greater share of the construction industry budget throughout the world. The established method of erecting the roof or wall of a pre-engineered building is to erect the building frame which is comprised of primary and secondary structural members supported by a foundation. Once the foundation is constructed, the primary structural members are erected and attached to the foundation; next, the secondary structural members are connected across the primary structural members. Appropriate bracing members are interconnected, and roll blanket insulation is placed either across or parallel with the secondary structural members and temporarily secured in place by weights or some other securing means.

The panel members are then disposed over the blanket insulation, and the panel members and underlying secondary structural members are connected together by fasteners. Typically, the attachment of roof panel members is done by workmen who stand on top of the panel members and attach the panel members to the underlying secondary structural members (which will usually be purlins or bar joists). The panel rests substantially on the underlying secondary structural member. The blanket insulation is compressed throughout the vicinity of the intersection of the panel and underlying secondary structural member. Compressed insulation has only a small fraction of its uncompressed insulating capacity. Blanket insulation placed perpendicular to the secondary structural, which is the usual case, and compressed between two objects such as the panel and the secondary structural member typically requires a distance of about five times its original thickness to recover to its full thickness. Thus a six inch blanket would require about 2.5 feet on both sides of the secondary structural to recover its full thickness. This resulting zone of compression substantially reduces the insulation's resistance to heat transfer.

The installation of insulation in the above described manner presents a major problem in the construction of pre-engineered buildings. As the panel members are connected to the underlying secondary structural members, the underlying blanket insulation, which is normally a compressible but nonelastic material, is compressed between the panel members and the secondary structural members. This compression of the insulation is undesirable, as it reduces or destroys the thermal effectiveness of the insulation.

The purpose of connecting the panel to the secondary structural member is to secure the panel members and to transfer externally imposed load from the panel members to the secondary structural members, which in turn transfers the stress to the primary structural members. These imposed loads create stress which may be tension, shear or compressive stress. As to the latter, compressive stress is created by inwardly directed live load which is transferred through the blanket insulation. As the panel members move relative to the secondary structural members during the life of the building, looseness occurs at the connector locations, and it is difficult if not impossible to maintain watertightness at these connector points.

One prior art solution to this problem of compressed insulation is the provision of elastic insulation boards disposed between the insulation and the panel members. These insulation boards are located such that the panel members rest on the insulation board which rests on the compressed blanket insulation, which is in turn supported by the underlying structural members. The insulation boards have an improved resistance to heat transfer, and in their immediate area create a better thermal barrier and spread the inwardly directed load that causes compression over a larger area of the glass fiber insulation. This decreases the amount that the insulation is reduced in thickness to some extent; however, the insulation is so weak structurally that no substantial improvement occurs. While use of the insulation boards is an improvement over the previously described prior art method, it still has a number of shortcomings. Among these is the fact that the blanket insulation is still compressed between the insulation boards and the underlying structural members, and since the zone of compression in the blanket insulation extends well beyond the edge of the insulation board, there still exists a substantially reduced resistance to heat transfer. Further, the insulation boards are expensive and difficult to install in that they must be held in place while the overlying panel is being connected. This is discussed in more detail in my U.S. Pat. No. 4,329,823 entitled "Support Spacer Apparatus."

The need to transfer shear stresses from the panel members to the underlying structural members is well-known in the pre-engineered building industry. This shear action requires that the force parallel to the plane of a panel be transferred through the fastening system to the underlying secondary structural members. While the use of insulation boards has helped somewhat in regard to increasing the thermal effectiveness of the roof to resist heat transfer, the shearing action on the panel to the underlying structural connector has become a greater problem. The reason for this is that the underlying structural members are separated from the panel by a greater distance. This causes the offsetting shearing force to act through a greater moment arm and the connector must be correspondingly increased in strength or the force compensated for in some other manner. The problem of maintaining a watertight seal around the connector is more difficult with the use of such insulation boards.

Taylor, U.S. Pat. No. 3,394,516, taught the use of a spacer between the panel members and the secondary structural members to prevent the panel members from being pulled so close to the secondary structural members as to crush or compress the insulation. The Taylor spacer had a plurality of pointed stand-off legs that penetrated the insulation. The panel members were then placed over the spacers, and sheet metal screws passed through the panel members to secure the panel members to the secondary structural members. The Taylor spacer is discussed in more detail in my above referenced U.S. Pat. No. 4,329,823 entitled "Support Spacer Apparatus."

It is highly desirable to create a substantially uniform, effective resistance to energy transfer through building roofs and walls, and this can be accomplished by applying a uniform thickness of insulation material about the enclosed building surface, usually referred to as the "building envelope." A uniform resistance to heat transfer eliminates thermal short circuits, reducing air conditioning and heating costs. While the use of compressed blanket insulation has in the past had some inherent disadvantages, work with various other materials has generally been unsuccessful in providing an adequate substitute for blanket insulation. A building is basically a composite of numerous structural elements, and materials having good structural characteristics are normally poor thermal insulators, while good thermal insulators, on the other hand, normally are structurally weak.

Some designers have attempted to interweave materials having good structural characteristics with those which have good insulating characteristics to create a more effective building envelope. Among such various prior art insulation solutions of this type are structural surfacing materials such as steel or concrete with "spray on" materials such as isocyanurate or similar foams field-applied on the inside or outside of the structural surface material. Spray on materials have the potential advantage of covering the building surface, regardless of its configuration, in a relatively uniform manner. While this method eliminates thermal short circuits, the spray on materials also have numerous shortcomings. Among these are high costs resulting from the field labor involved; poor quality control which frequently leads to inadequate bonding so that the insulation often delaminates; and project delays because of inclement weather conditions.

Another prior art solution is represented by paneling systems which are factory- or field-assembled and are composed of various combinations of materials. Among the paneling systems that have been tried are laminated systems composed of one or more rigid facing materials with an appropriate semi-rigid insulation attached to the rigid material for support. Again, these systems are discussed more fully in my earlier mentioned U.S. Pat. No. 4,329,823 entitled "Support Spacer Apparatus."

Other paneling systems, sometimes referred to as sandwich panels, have used relatively dense batt insulation of the glass fiber type and usually rely on perimeter framing to hold the insulation in place. The insulation either has to be strong enough to support its own weight without gradual crushing, or friction support must be employed. Friction from the insulation itself is often inadequate to hold the insulation in place and, as a result of vibration from wind or transportation, the insulation often becomes dislodged. The insulation itself is structurally weak and even support pins do not serve to prevent the insulation from settling when it is used as a vertically extending wall. In the past, this type of paneling system has been relatively expensive and has not solved the problem of preventing thermal short circuits through the insulation. Further discussion on this type of paneling system is provided in my before mentioned patent.

While many insulation methods have been attempted, the use of compressible blanket insulation remains to be the least expensive and most effective means of insulating a building structure, which accounts for its wide acceptance in the building industry. Of course, blanket insulation is totally effective only if the design of a building structure provides for maintaining uniform blanket insulation thickness and for keeping the insulation dry.

A typical blanket insulation consists of a light weight, highly compressible, structurally weak insulation material laminated to a light weight, relatively high tensile, impervious facing membrane. The blanket insulation is normally positioned and maintained in place while applying restraining force to the facing membrane through a friction connection. In normal practice, the friction connection compresses the insulation as discussed hereinabove, and this compression materially reduces or destroys the effectiveness of the insulation, creating numerous thermal short circuits in the wall or roof structure. The frictional connection has not been sufficient to prevent the facing from bagging between frictional support points. This leads to an unsightly appearance and a collecting point for water leaking through the roof. The collection of the water concentrates even more weight at that point which results in greater deflection and, in turn, more water collects. Eventually this process results in significantly lower resistance to heat transfer and the weight may even break the membrane, suddenly dropping large quantities of water on the contents or occupants.

Alderman, U.S. Pat. No. 4,147,003, taught the use of straps to support a support trough for the placement of insulation between secondary structural members. This support trough serves only to insulate between the secondary structural members, while insulation at the secondary structural members is still achieved by semi-rigid insulation boards that are placed above the secondary structural members or not at all. The Alderman method is particularly susceptible to collecting pockets of water from either roof leaks or condensation occurring on the inside face of the panel and dropping onto the insulation and collecting on the membrane. Roof fasteners may pass through these insulation boards, and the above described problems are presented, resulting in serious thermal inefficiencies over the secondary structural members.

Laminated blanket insulation has been installed by clamping it between exterior panels and the underlying structural members as discussed above. This served the dual purpose of transferring load from the panel through the insulation to the underlying structural system while securing the insulation in place. Not only does the clamping of insulation between panel and structural members result in serious thermal inefficiencies, it also results in nonuniform tensile stress being created in the laminated material, leading to wrinkles across the facing of the blanket insulation. Thus, when the laminated material is visible in the interior of the building, a generally poor appearance results. The reason for this nonuniform tensile stress is that the beam strength of the panel between the fasteners that secure the laminated material is insufficient to exert adequate frictional force to spread the tensile load in the insulation facing uniformly across the width of the insulation.

In most instances, laminated insulation is simply cut below the bottom of the wall panel or at the edge of the roof panel, and the end of the insulation is exposed to rain, snow or other moisture. As a result, the insulation "wicks" water into the body of the insulation for a considerable distance along its length. This water further decreases the thermal efficiency of the insulation, and it also results in corrosion of the panel members, the base angles and other supporting parts. Another source for intrusive moisture is the breakdown of the vapor barrier caused by the uneven tensile stress exerted on the blanket insulation, resulting in stress tears and punctures.

SUMMARY OF THE INVENTION

The present invention provides an improved roof insulation system in which a membrane, of the type used as facing for blanket insulation, serves as structural support for a layer of insulation material, as a stabilizing element for the secondary structural members, as a safety device to reduce injuries to workmen, as an improved vapor barrier, as a means of conducting water from roof condensation or leaks to the outside of the building or suitable interior gutter, to eliminate wicking, and to improve the aesthetics and watertightness of the interior of a building. A membrane attaching assembly provides substantially uniform tensile stress distribution in the membrane, resulting in proper placement and positive positioning of the insulation which needs not be laminated to the membrane. The uniform stretching causes the membrane to be uniform in appearance, substantially straight so that bagging between structural supports is minimized and provides a pleasing appearance.

The present invention provides an insulated wall or roof system for enclosing and insulating a building structure and comprises a flexible membrane; a membrane attaching assembly which attaches the first end of the membrane to a first support portion of the building's structural assembly and attaches a second end of the membrane to a second support portion of the structural assembly; a tertiary structural assembly which is connected to the building structural assembly, the tertiary structural assembly having a portion which extends from the structural assembly; insulation material which is supported by an insulation support side of the membrane; and a panel member which is attached to the tertiary structural assembly and positioned substantially parallel to the insulation layer to dispose the insulation layer between the panel member and the underlying structural assembly of the building.

The present invention also provides an improved roof structural bracing system for interconnecting the wall of a building via a wall connector to a primary support beam so as to minimize or prevent failures of the wall connector due to translational and rotational movement of the wall connector as a load is applied thereto.

The present invention further provides an improved bracing system for the tertiary structural assembly of the building to minimize or prevent failures of the tertiary structural assembly due to the translational and rotational movement of the tertiary structural assembly as a load is applied thereto while at the same time other tertiary structural assemblies connected to other elements of the roof move in unison with the roof as the roof changes shape because of expansion and contraction or other forces.

The present invention further provides an improved bracing system for a building comprising primary, secondary and tertiary support assemblies to stabilize the secondary support assembly with respect to the primary support assembly and the tertiary support assembly with respect to the secondary support assembly such that when roof panels are attached to the tertiary support assembly, the roof panels are restricted from movement with respect to the primary support assembly at the area of bracing system attachment.

Accordingly, an object of the present invention is to provide an improved insulated roof system for enclosing and insulating a building structure.

Yet another object of the present invention, while achieving the above stated object, is to provide an insulated roof system which utilizes the structural characteristics of a flexible membrane to support a full thickness layer of insulation to maintain substantially uniform resistance to heat transfer and vapor penetration throughout the insulated roof system.

A further object of the present invention, while achieving the above stated objects, is to provide an insulated roof system which utilizes the structural characteristics of a flexible membrane as a support for insulation material while maintaining uniform stress in the membrane and eliminating or minimizing compression of the insulation material.

Another object of the present invention, while achieving the above stated objects, is to improve the aesthetic qualities of a vapor barrier in the building envelope of a structure.

Still yet another object of the present invention, while achieving the above stated objects, is to provide an insulated roof system and method of construction of same that will minimize the cost of enclosing and insulating a building structure while increasing the heat transfer resistance of the structure, while providing ease of insulation and minimizing upkeep expense of the insulation envelope.

Still yet another object of the present invention, while achieving the above stated objectives, is to use the substantially uniformly taut membrane as a safety device to catch falling items and help prevent injury or damage to them.

Still another object of the present invention, while achieving the above stated objects, is to provide an improved panel system in which load is transferred from a panel member to underlying portions of a structural assembly while minimizing the diminution of heat transfer resistance of an underlying layer of compressible insulation material.

Still yet another object of the present invention, while achieving the above stated objects, is to provide an improved structural bracing system which minimizes or prevents failure of components of a pre-engineered building structure which are subject to translational or rotational movement as load is applied to such components.

Still another object of the invention, while achieving the above stated objects, is to provide a means of conducting moisture from points of leak or condensation to an area where such water can be conducted to a drain or outside the building, thus minimizing the destruction of property inside the building.

Other objects, features and advantages of the present invention will become clear from a reading of the following detailed description when read in conjunction with the drawings and appended claims.

BRIEF DESCRIPTION OF THE DRAWINGS

FIG. 5A depicts an edge-to-edge overlap of adjacent membranes.

FIG. 5B depicts a roll lap joint created between adjacent membranes.

FIG. 6 is an isometric view of a portion of another roof system constructed in accordance with the present invention in which a panel support beam of the roof system is disposed substantially perpendicular to the horizontally symmetrical underlying secondary structural.

FIG. 6A is an elevational, partial cross sectional view of a panel support assembly in the roof system of FIG. 6.

FIG. 7 is an elevational, semi-schematical view of a portion of the structural attachment means of the insulated roof system of the present invention wherein the insulation and membrane are omitted for clarity.

FIG. 8 depicts a cross sectional view of a nonslip joint used in the insulated roof system of the present invention.

FIG. 9 shows an elevational view of a purlin supporting the panel support assembly of the present invention.

FIG. 9A shows a view taken at 9A—9A in FIG. 9.

FIG. 10 is an elevational view of another panel support assembly utilized in the present invention.

FIG. 10A is a view at 10A—10A in FIG. 10.

FIG. 11 is an elevational, semi-schematic view of an insulated roof system depicting a wall structural bracing system and tertiary structural bracing system for a building structure constructed in accordance with the present invention.

FIG. 11A shows a view taken at 11A—11A in FIG. 11.

FIG. 11B is an enlarged view of the roof connector device shown in FIG. 11.

DESCRIPTION

My above referenced patent entitled "Support Spacer Apparatus" provides a description of a pre-engineered building constructed and insulated in accordance with established methods of erection. For brevity, that description is not repeated herein; rather, the descriptions contained in the patent are incorporated herein by reference.

Figure 1:
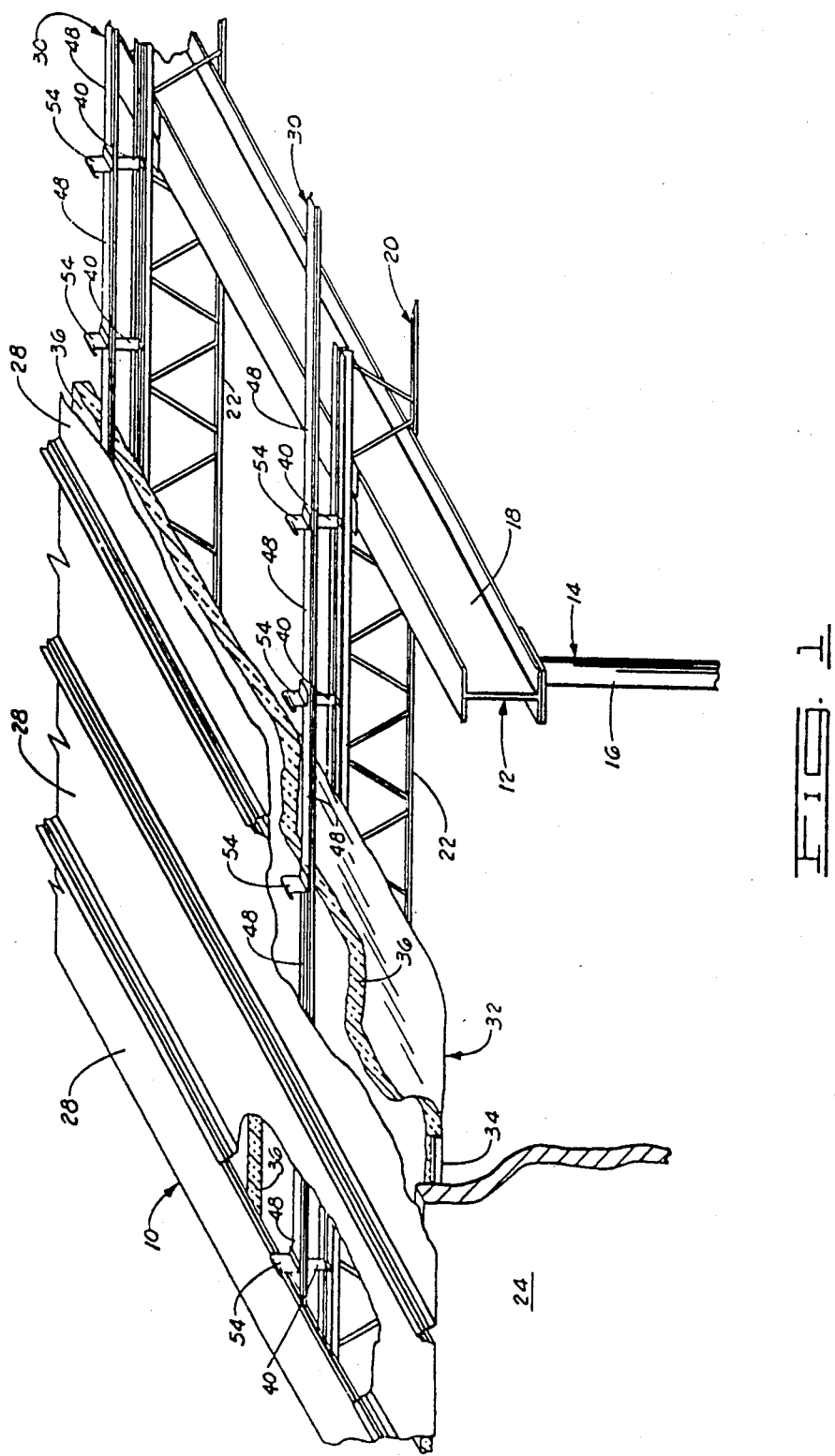
FIG. 1. is an isometric, partial cutaway view of a portion of an insulated roof system constructed in accordance with the present invention in which a panel support beam of the roof system is disposed substantially parallel to the horizontally symmetrical underlying secondary structural.

Referring to the drawing, and particularly to FIG. 1, a portion of a building roof 10 is supported by a building structure 12. The building structure 12 comprises a primary structural system 14 which consists of a plurality of upwardly extending column members 16 (only one being shown) that are rigidly connected to a foundation (not shown). Also, the primary structural system 14 has a plurality of primary beams 18 which are generally horizontally disposed and supported by the column members 16.

A secondary structural system 20 comprising a plurality of open web beams 22, also referred to herein as bar joists, are supported by the primary beams 18 and are also generally horizontally disposed. While C -- or Z -- purlins or wood beams could as well be used as the secondary structurals in the practice of the present invention, the present invention will first be described with reference to the bar joists 22 shown in FIG. 1.

Also supported by the foundation of the building is a wall structure 24, typically tilt-up concrete slabs or light gage metal panels, that are attached at the upper ends thereof to the primary structural system 14 via roof connector devices or device 26 (see FIG. 11) as will be described in detail hereinafter with reference to FIGS. 11 and 11B. A plurality of roof panels 28 are supported over the secondary structural system 20 by a plurality of panel support assemblies 30 described further hereinbelow, and which are attached to the upper flanges of the bar joists 22. The roof panels 28 are depicted as being standing seam panels, with their interlocking edge seams being supported by clip portions of the panel support assemblies 30, but it will be understood other types of panels could be used with the present invention, including built-up roof decking.

A flexible membrane 32 is disposed to be stretched tautly over the bar joists 22 beneath the panel support assemblies 30 and secured thereby to the top flanges of the bar joists 22. The ends of the flexible membrane 32 are secured to the structure 24 via membrane connector devices 34 such as a rectangular bar member and as will be made more clear hereinbelow. A layer of insulation 36 is supported by the flexible membrane 32 beneath the roof panels 28 in substantially its pre-installed state. If necessary, the length of the membrane 32 can be adjusted by rolling the ends about the membrane connector devices 34, as discussed further hereinbelow.

While the above description provides an overview of the structural components of an embodiment of the insulated roof system of the present invention, the invention will be more fully explained with reference to detailed drawings of the system and by describing the method of installation. Before describing the insulation used in the present invention, a comment is in order on the prior art blanket insulation of the variety that has found wide usage in the pre-engineered building industry. Such insulation is usually a laminated product that comprises a layer of compressible mineral insulation or chopped glass fiber insulation (such as fiberglass) which is bonded via an adhesive to a flexible facing membrane. The facing membrane may consist of one or more thin layers of materials such as aluminum foil or vinyl plastic which serves a decorative purpose as well as providing a vapor barrier for the building envelope. A typical blanket for batt insulation is made by the Mizell Brothers Company of Dallas, Tex., which is a product comprising a laminated facing membrane made of a layer of vinyl, a layer of fiberglass scrim, and a layer of aluminum foil. Bonded to the facing membrane is a thick layer of compressible fiberglass material.

Figure 2:
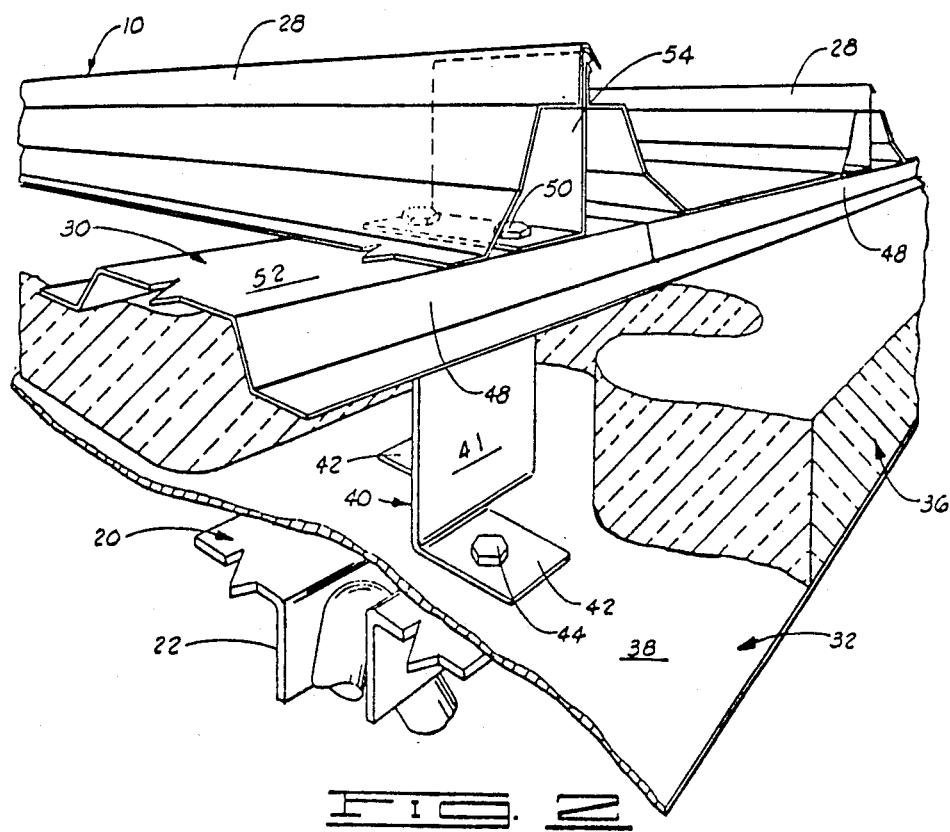
FIG. 2 is a perspective, partial cutaway view showing some of the component parts of the insulated roof system of FIG. 1.

The present invention does not require that a laminated insulation product of the type just described be used, although such could be used. Rather, the membrane 32 is preferably an independant, structural member which serves to provide a continuous membrane vapor and water barrier and it also serves as a support member for the layer of insulation 36. Referring to FIG. 2, the membrane 32 is a flexible facing-like membrane preferably of about one to two mils in thickness and may have an embedded scrim such as fiberglass, nylon, or any material capable of taking tensile load. An acceptable membrane is the VRP-3 membrane product made by the Stauffer Chemical Company of Edison, N.J.; the VRP-3 product has a vinyl membrane, a fiberglass scrim and a layer of metallized polyester film for a total membrane thickness of about two mils. This membrane is very durable and one which is easily installed. The flexible membrane 32 is installed over the secondary structural system 20 by attaching a first end of the membrane 32 to a first support member and attaching a second end of the flexible membrane 32 to a second support member so that the flexible membrane 32 extends substantially taut therebetween and whereby the membrane 32 extends as a membrane plane over the top flanges of the bar joists 22.

This invention provides for anchoring the ends of the facing membrane 32 securely to a substantially rigid structural member such as a building wall or roof structural so that the flexible membrane 32 will generally conform to the upslope of the building roof 10. Doing this results in the membrane's being able to resist substantial load normal to its surface without undue deflection of the membrane 32 and without tearing the membrane 32 at the point of anchorage, and enables water or condensate deposited on the membrane 32 to flow in a down-hill direction to a point where it can be collected and then conducted via suitable drains (not shown) to gutters or downspouts where it can be disposed of without damage to the building interior. This may be accomplished by wrapping the membrane 32 around the membrane connector device 34 several times so that the friction between the membrane 32 and the membrane connector device 34 prevents the membrane 32 from disengaging the membrane connector device 34 and applies substantially uniform stress across the membrane 32. The membrane connector device 34 has sufficient beam strength between fastener points to resist the load imposed on it by the tautness of the membrane. The ability to resist loads normal to the surface of a flexible membrane 32 by applying tension to the flexible membrane 32 is sometimes referred to as "catenary action" and has many useful adaptations besides supporting the layer of insulation 36 in a beneficial manner. Among these benefits is the membrane's ability to prevent objects dropped by workmen installing the roof panels 28 from falling through the plane of the membrane 32 and injuring those below or damaging the dropped objects. The membrane 32 acts somewhat the same as the safety net often assembled under a trapeze artist while performing.

The panel support assemblies 30, which can be fabricated of metal, plastic or combinations of metal/plastic materials, serve to secure the membrane 32 plurally along each of the bar joists 22 in the manner shown in FIG. 2 wherein is shown a portion of one of the panel support assemblies 30.

As will become clear, each of the panel support assemblies 30 extends substantially parallel to one of the bar joists 22, and in combination, the panel support assemblies 30 serve to form a tertiary structural assembly which is connected to the building structural assembly and which supports the roof panel members 28 for at least partially enclosing the building structural assembly. The flexible membrane 32 has an insulation support side 38 on which the layer of insulation 36 is supported.

Figure 3:
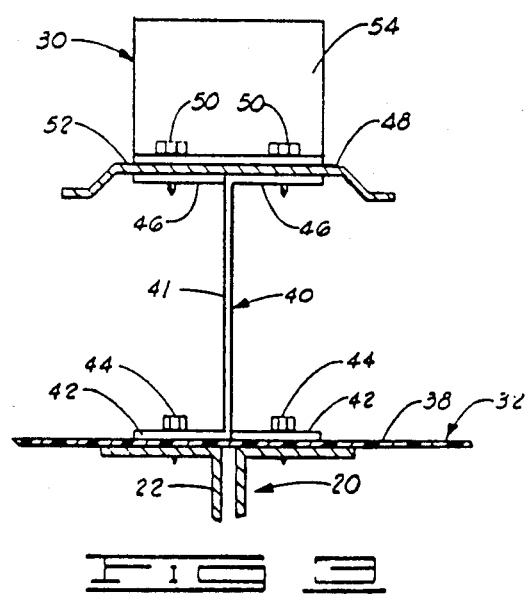
FIG. 3 is an elevational, partial cross sectional view of a panel support assembly of the insulated roof system of FIG. 1.

The panel support assembly 30 shown in FIG. 2 comprises a plurality of base clips 40, each of which has a median web portion 41. The base clip 40 is shown with its web portion 41 parallel to the longitudinal axis of a panel support beam 48 to accommodate movement perpendicular to the panel support beam 48. It is understood that web portion 41 can be rotated to gain greater rigidity between the base clip 40, the panel support beam 48 and the underlying bar joist 22. At the lower end of the median portion 41 there is formed a pair of oppositely extensive leg portions 42 through which self-drilling and self-tapping screws 44 extend to secure the base clip 40 to the underlying bar joists 22. As shown in FIG. 3, the attachment of the base clip 40 serves to secure the flexible membrane 32 to the top web of the bar joist 22. Securing the flexible membrane 32 to the top web of bar joist 22 and to membrane connector devices or device 34 located at opposite ends of flexible membrane 32 positions the top web of joist 22 to prevent lateral movement, thus strengthening joist 22 as load is imposed on it. Further description of the initial positioning of the membrane 32 is provided hereinbelow. The upper end of the median portion 41 of the base clip 40 has a pair of oppositely extensive upper leg portions 46 (viewable only in FIG. 3). The directions of extension of the upper leg portions 46 are selectively oriented to provide clearing access to a driving tool implement which is used to install the screws 44 through the lower leg portions 42 of the base clip 40.

The panel support assembly 30 also comprises a plurality of the panel support beams 48 that are generally elongated channel-shaped members which are arranged in overlapping end-to-end relationship such that the longitudinal axes thereof are substantially parallel to the underlying bar joist 22 when attached thereto. These panel support beams 48 are connected to the upper leg portions 46 of the plural base clips 40 via bolts or rivets 50. This serves to place the panel support beams 48 at a predetermined distance above the underlying bar joist 22 for the purpose of providing clearance below the panel support beams 48 in order to permit the layer of insulation 36 to be positioned thereunder. The height of the base clips 40 may be established such that an air space will be provided over the layer of insulation 36 and below the panel support beams 48 as shown and described hereinbelow with reference to FIG. 6A.

The roof panels 28 can be bolted directly to the panel support beams 48 with an upper support surface 52 thereof providing support for the flat portions of the roof panels 28. If a standing seam roof panel is to be used, as illustrated by the roof panels 28 in FIGS. 1 through 3, an upwardly extensive panel clip 54 can be secured to the upper support surface 52 of the panel support beams 48 via the bolts 50, and the seaming side edge of the standing seam roof panels interlocked therewith. As noted more fully hereinbelow, the base clip 40 of the present invention provides a stationary clip having the flexing capability of floating clips of much more complex design, since the median web portions 41 of the base clips 40 are oriented normally to the longitudinal direction of the roof panel 28. Thus, the median web portion 41 has the capability to flex and elastically rotate as the longitudinal thermal expansion of the roof panel 28 occurs.

While the panel support assembly 30 in FIG. 2 has several inline panel support beams 48 which overlap at abutting ends, it will be possible to reduce the length of each of the panel support beams 48 in certain applications, such that the upper support surface 52 is eliminated at intervals along the longitudinal axis. Since the purpose of the panel support beams 48 is to support the roof panels 28, the amount of support is a function of the panel configuration and amount of load to be imposed on the roof panels 28 and the underlying support can be adjusted accordingly. Also, the panel support assembly 30, while discussed hereinabove as comprising a number of component parts, can be of unitary construction as may be desired for particular applications.

Figure 4:
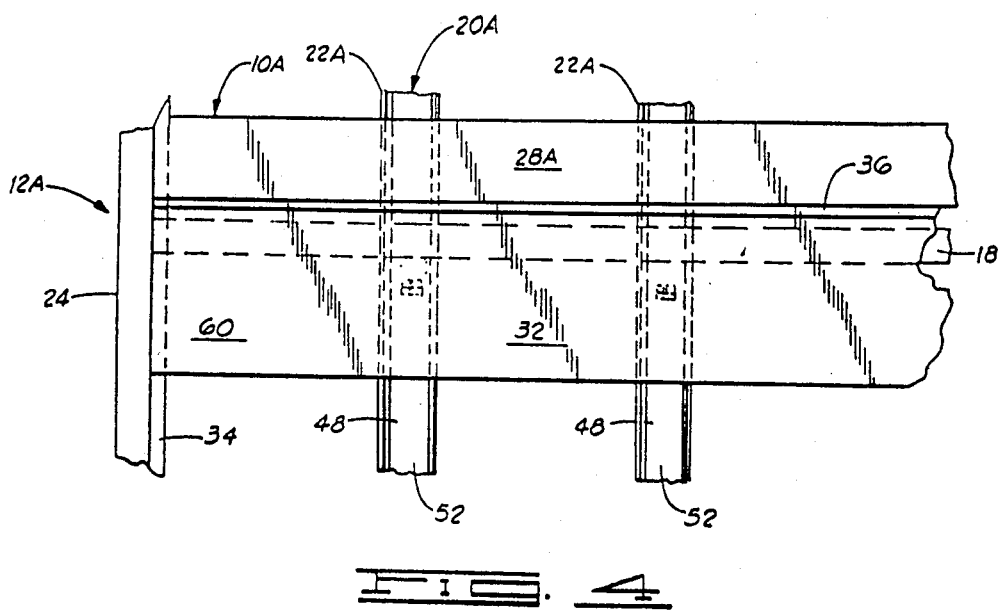
FIG. 4 is a plan, semi-schematical view of an insulated roof system constructed in accordance with the present invention in which the panel support beam of the roof system is disposed substantially parallel to the asymmetrical underlying secondary structural member.
Figure 5:
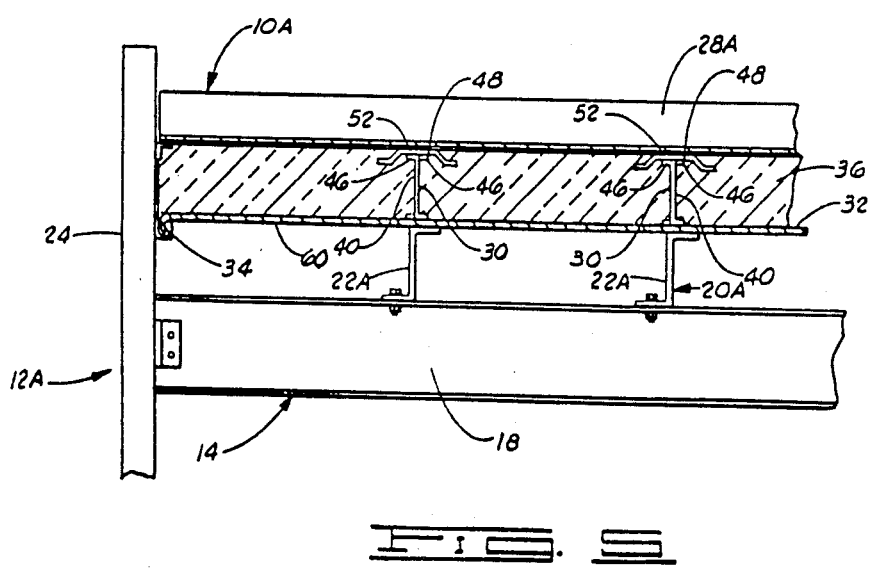
FIG. 5 is an elevational, semi-schematical view of the insulated roof system shown in FIG. 4.

Installation of the insulated roof system of the present invention is most easily viewed with reference to FIGS. 4 and 5 which are semi-schematical plan and elevational views, respectively, of a portion of a pre-engineered roof 10A constructed on a pre-engineered building structure 12A in accordance with the present invention. These figures differ from the previously discussed drawings only in that they show the use of purlins 22A as a secondary structural system 20A and conventional roof panels 28A. Accordingly, like numerals to those used in the previous figure will be used in FIGS. 4 and 5 to denote identical components previously described.

The pre-engineered building roof 10A is built on the pre-engineered building structure 12A having wall structure 24 (only one wall is shown), the primary structural system 14, such as the primary beam 18, and the secondary structural system 20A comprising Zee purlins 22A. One end 60 of the flexible membrane 32 is secured to the inner surface of one of the walls of the wall structure 24 via the connector device 34 which may be a channel member with several wraps of the end 60 of the membrane 32 about it to adjust the length of the membrane 32 to a required length, and the membrane connector device 34 is secured to the wall of the wall structure 24 via anchor bolts (not shown) at intervals therealong. This provides a uniform gripping means for holding the first end 60 of the flexible membrane 32. The distal second end of the flexible membrane 32, not shown, is attached in like manner to an opposite wall or other support member, and the flexible membrane 32 is caused to extend as a taut membrane plane over the upper flanges of the purlins 22A as shown. Next, the base clips 40 of the panel support assemblies 30 are bolted (via bolts which are not shown in the semi-schematical FIGS. 4 and 5) at spaced-apart intervals over the membrane 32 to the underlying purlins 22A. This attaches the membrane 32 to the underlying purlins 22A and imparts lateral structural support to the purlins 22A; that is, by securing the flexible membrane 32 to the upper flanges of the purlins 22A and to the membrane connector devices 34, the flexible membrane 32 prevents lateral movement of the purlins 22A and thus strengthens purlins 22A as load is imposed on them.

With the base clips 40 secured thusly in place, the layer of insulation 36 is laid onto the flexible membrane 32 and positioned closely about the base clips 40. The panel support beams 48 are next secured to the upper leg portions of all of the base clips 40 that are in place via bolts not shown in the semi-schematical FIGS. 4 and 5. Finally, the roof panels 28A are bolted directly to the upper support surfaces 52 of the panel support beams 48. It will be noted that the roof panels 28A are advantageously disposed in parallel juxtaposition to the layer of insulation 36; thusly, during construction, panel and insulation installation may progress together.

The pre-engineered building roof 10A is erected by repeating the above described sequence of component placement and securement. That is, another width of the flexible membrane 32A is disposed in an adjacent relationship with the already installed flexible membrane 32, as shown in FIG. 5A in which the edge of membrane 32 is overlapped by membrane 32A and adhesively bonded together, preferably with a hot melt adhesive or a tape bead. Alternatively, the abutting edges of the membrane 32 and a membrane 32B can be rolled together and stapled as shown in FIG. 5B in which staples 33 have been placed through the roll lap joint of the membranes. In practice, the roll lap joint may be rolled and stapled any number of times and the roll lap joint flattened more than depicted in the drawing.

Once the next width of membrane has been secured to opposite walls of the wall structure 24 and stretched tautly over the secondary structural members 20A, the panel support assemblies 30 can be installed in the manner described above, and the roof panels 28A attached thereto. This sequence is repeated until the entire roof assembly is completed. As pointed out above, succeeding widths of membrane can serve as a safety restraint during the securement of the roof panels over previously positioned membrane widths. As shown in FIG. 4, a restraining net-like function can be performed by the membrane 32 if the succeeding widths are caused to extend beyond the longitudinal edges of the panel member 28A such that an object dropped by a workman who is working on top of the roof panels 28A will alight on top of the exposed top surface of the membrane 32. If the composition of the membrane 32 is selected to have sufficient tensile strength to withstand a predetermined tensile loading, the presence of the membrane protrusive beyond the roof panel can represent a significant safety consideration. Of course, objects might be of such weight as to penetrate the membrane and continue falling, but such objects would nevertheless have a momentary braking force which in most cases would prove advantageous from a safety standpoint.

When load is imposed on the external roof panel 28 or 28A, such as wind load, this load is transferred to the underlying secondary structural system 20 or 20A via the panel support assemblies 30, which serve as a tertiary structural system and panel securing means, in the form of tension, shear or compressive stress imparted therein, and although the load is transferred downwardly through the layer of insulation 36, the original quality of the layer of insulation 36 is retained. In other words, while the underlying secondary structural systems 20, 20A receive stress from the transference of load via the panel support assemblies 30, the layer of insulation 36 will substantially uniformly retain its resistance to heat transfer. While the base clips 40 of the panel support assemblies 30 do provide a path of thermal energy transport between the roof panels 28, 28A and the underlying secondary structural system 20, 20A, a negligible amount of heat loss is experienced relative to the total area of the pre-engineered building roof 10, 10A partly because of the small cross sectional areas of the base clips 40, the increased length of this path, the interposition of the flexible membrane 32 between the leg portions 42 of the base clip 40 and the underlying secondary structural system 20, 20A. Also, this direct connection of the roof panel members 28A to the underlying panel support beams 48A prevents or minimizes "dimpling" which occurs at the connecting points of the panel members when installed with insulation interposed immediately between the panel members and underlying structurals, as is presently practiced in the prior art. This "dimpling" of the panel member, which is a cavity around each fastener head or clip location, provides low spots that will catch moisture, and the elimination of such "dimpling" by the present invention enhances the watertightness and durability of the roof.

One advantage of the present invention is that it permits independent placement of the roof panels 28, 28A as required to accommodate a design roof slope preference. The usual structural layout for a pre-engineered building is that which is shown in FIG. 1 wherein the longitudinal axes of the roof panels 28 extend perpendicular to the longitudinal axes of the secondary structural system 20, such as the bar joists 22. Sometimes it is desirable to dispose the roof panels 28A to extend parallel to the secondary structural system 20, such as the bar joists 22, as shown in FIG. 6. In FIG. 6, the bar joists 22 are extended between sidewalls of the wall structure 24 instead of between end walls. This view depicts only portions of a pre-engineered building roof 10B in the installed position in order to illustrate this feature of the present invention. Like components will be identified with the numerals used hereinabove in reference to the previously described drawings.

The installation of the pre-engineered building roof 10B begins in the same manner described above with reference to the installation of the pre-engineered building roof 10 and 10A. That is, the flexible membrane 32 is extended and secured via connector devices (not shown) tautly over the upper flanges of the bar joists 22. The membrane 32 may extend perpendicular to the underlying bar joists 22, as shown and described, or the membrane 32 may extend parallel to the bar joists 22. If the membrane 32 is extended parallel to the bar joists 22, it may be supported at intervals transversely by taut straps (not shown) positioned over the top flanges of the bar joists 22. If membranes 32 and 32A are installed perpendicular to bar joists 22, as shown in FIG. 6A, it is advantageous to lap overlying edge of membrane 32A so that the downward edge of each upper membrane section 32A overlaps the upper edge of lower membrane section 32. This causes water or condensate to drain to the lower edge of the roof slope under consideration so it may be collected and conducted out of the building. Water collected on the flexible membrane 32 and 32A can be drained therefrom via an opening 95 formed in the mastic supporting the roof connector device 26, or by any other small drainage assembly.

Next, a plurality of base clips 40A are attached over the flexible membrane 32 to the upper flanges of the bar joists 22 via self-drilling, self-tapping screws 44 which are placed through lower leg portions 42A of the base clips 40A, as shown in FIG. 6A, which shows an enlarged partial cross-sectional view of the roof system 10B. Once the base clips 40A are in position, the insulation layer 36 can be placed on top of the flexible membrane 32 in the manner described above. The base clips 40A are positioned such that a median web portion 41A of the base clip 40A is aligned such that a Zee sub-purlin 61 extending laterally to the bar joists 22 is supported by one of the base clips 40A on each of the bar joists 22 along the length of the sub-purlin 61 in the manner shown in FIG. 6A. Since the flat portion of the roof panel 28A will extend in the space between parallel bar joists 22, the sub-purlin 61 provides sufficient strength to support the roof panels 28A. The sub-purlin 61 is secured to each of the base clips 40A via a self-drilling, self-tapping screw 44A. Finally, the roof panels 28A are secured to the top surface of the sub-purlins 61 via self-drilling, self-tapping screws 44B.

In practice, one width of the flexible membrane 32 is rolled out, positioned above the bar joists 22, stretched taut and secured. After the base clips 40A and the sub-purlins 61 are installed, additional widths of the flexible membrane 32 are laid out in edge-to-edge spatial relationship to already in place membrane, and the edges are overlapped and sealed as mentioned above. These steps are sequentially completed as the pre-engineered building roof 10B is progressively installed.

One feature of the present invention, as illustrated in FIG. 6A, is the provision of an air plenum 62 between the underside of the roof panel 28A and the top of the layer of insulation 36. The air plenum 62 is optional and its inclusion is determined by establishing the length of the median web portion 41A of the base clips 40A to extend above the layer of insulation 36. The purpose of the air plenum 62 is to increase the heat transfer resistance of the pre-engineered building roof 10B, and while static air in the air plenum 62 is beneficial, air movement devices, such as conventional attic ventilators, may be incorporated to increase the thermal transfer resistance of the pre-engineered roof 10B.

As discussed in my above mentioned patent and pending patent applications, end-to-end panel support assemblies 30 are mounted along a purlin overlap at intervals to form overlapping joints. Significant structural strength increases can be obtained by connecting these joints with nonslip connectors if certain other interconnections are made between the panel support beams 48 and the supporting secondary structural system 20A, such as the purlins 22A. In FIGS. 7 through 10A, one purlin 22A has an end 70 supported by the primary beam 18, and an end 72 which overlaps the end 74 of an inline purlin 22B. The overlapped ends 72 and 74 of the purlin 22A and 22B are supported by another of the primary beams 18. At the end 70 of the purlin 22A, a support plate member 76 is boltingly connected to the upper flange of the purlin 22A as shown in FIG. 9, and bolted to the underside of the panel support beam 48. Another support plate member 76 is disposed at an appropriate point, such as over the primary beam 18 shown in FIG. 7, and bolted to the upper flanges of the overlapping ends 72, 74, of the purlins 22A, 22B. This support plate member 76 is also disposed beneath the overlapping ends of the inline panel support beams 48, 48A. The purlins 22A and 22B are of a Z-shaped configuration, which is a typical purlin used in the pre-engineered building industry. The purpose of the support plate members 76 is to provide a shear connection between the panel support beams 48, 48A, and the purlins 22A, 22B at those positions along the purlins 22A, 22B where desirable to transfer force, or load, between the panel support beams 48, 48A and the underlying secondary structural system. Thus the location of the support plate members 76 at the ends of the purlins, such as the end 70 of the purlin 22A which is not the overlapping ends of adjacent, inline purlins, such as other purlins, and the overlapped ends 72 and 74 of the purlins 22A and 22B, are supported over primary structural members.

The upper flanges of the support plate members 76 are bolted to the panel support beams 48, and at an overlapping joint 78 formed between the end-to-end panel support beam 48 and 48A. A special nonslip connection is provided between the support plate member 76 and the overlapping joint 78 as shown in FIG. 8. The advantage of the nonslip connector is that the mechanism designed to resist load comes into action more quickly or with less deflection or movement than if a more conventional bolted splice were used. The nonslip connection is made between the overlapped ends 72, 74 of the panel support beams 48, 48A and the support plate member 76 by fastener member 80 that is a self-drilling, self-tapping screw. An undersized guide hole may first be drilled through the portions of the panel support beams 48, 48A forming the overlapping joint 78 such that the hole extends through the panel support beams 48, 48A and the upper flange of the support plate member 76. The fastener member 80 can be driven through the guide hole to self-drill and tap through the three layers until the fastener member 80 is securely seated as shown. This method of providing a nonslip connection between the overlapping panel support beams 48, 48A and the upper flange of the support plate member 76 serves to completely fill the guide holes through each of the members for receiving the fastener member 80 therethrough. Once the fastener member 80 is properly seated, load is transferred from one overlapping member to the next overlapping member in such a manner as to prevent slippage.

An alternative to the support plate member 76, which is bolted to the top flange of the purlin 22A, is a support plate member 76A which is bolted to the main web of the purlin 22A, as shown in FIGS. 10 and 10A. The support plate member 76A has oppositely extensive upper leg portions 82A and 82B which are dimensioned to receive and support the panel support beam 48 which is secured thereto via self-drilling, self-tapping screws. The advantage of the support plate member 76A is that it positions the load-bearing panel support beam 48 centrally over the upstanding main web of the purlin 22A.

As shown in FIGS. 11, 11A and 11B, the wall structure 24A of the building structure 12, typically tilt-up concrete slabs, is supported by the foundation and attached at the upper ends thereof to the primary structural system 14 via a conventional wall connector device. While conventional means may be employed to connect the wall to the roof, roof connector device 26 and wall structural bracing system 90 of the present invention provides improved structural and insulating characteristics that are imparted to the building structure 12. It being desirable to stabilize one longitudinal point of the roof in relation to the underlying primary structural system while providing a full thickness layer of insulation over at least a portion of the wall structure 24. FIGS. 11, 11A and 11B illustrate a portion of a pre-engineered building roof 10C of a building structure 12B which differs from the previously discussed drawings only in the use of the roof connector device 26 and a wall structural bracing system 90. Accordingly, like numerals to those used in the previously discussed FIGS. 1, 2 and 3 will be used in FIGS. 11, 11A and 11B to denote identical components previously described.

The building structure 12B comprises the building roof 10C, a wall structure 24A, the primary system 14, such as the primary beam 18, and the secondary structural system 20, such as the open web beams 22. An upper end 92 of the wall structure 24A is connected to the roof 10C via the roof connector device 26. The roof connector device 26, which may take a number of shapes such as a conventional angle, is illustrated as an eave Zee having an upper flange portion 94, a median portion 96, and a lower flange 98. The lower flange 98 is secured to the upper end 92 of the wall structure 24A by conventional means, such as a bolt and interlocking nut, so that the upper flange 94 is disposable substantially adjacent a lower support surface 100 of the building roof 10C and securable thereto via self-drilling or self-tapping screws 44C. To restrict translational and rotational movement of the roof connector device 26, when same is subjected to load, the wall structural bracing system 90 connects the median portion 96 of the roof connector device 26 to the primary beam 18 substantially as shown in FIGS. 11 and 11B. The roof structural bracing system 90 comprises a structural brace member 102 having a first end portion 104, a median portion 106, and an opposed second end portion 108. The first end portion 104 is disposed to be attached to an element of roof connector device 26; and second end portion 108 is angularly disposed to the elongated axis of the median portion 106 so as to be attached to a support clip 120. The support clip 120, having a height 122 substantially equal to the height of the portion of the open web beam 22 overlying the primary beam 18, is secured to the primary beam 18 at a position substantially adjacent the second end portion 108 of the structural brace member 102 when the first end portion 104 is connected to the roof connector device 26.

As more clearly shown in FIG. 11A, the support clip 120 is provided with a pair of oppositely extensive leg portions 124, 126 through which self-drilling and self-tapping screws 128 extend to secure the support clip 120 to the underlying primary beam 18. The support clip 120 is also provided with a median portion 130 forming an upper support surface 132 through which self-drilling and self-tapping screws 134 extend to secure the opposed second end portion 108 of the structural bracing member 102 to the support clip 120. Structural support clip 120 may be constructed in any suitable configuration that enables it to transfer load from second end portion 108 to underlying primary beam 18 in such a manner that neither structural support clip 120 nor wall structural brace member 102 penetrates flexible membrane 32. The structural bracing member 102 can be fabricated of any suitable material, such as an angle member as illustrated in the drawings.

In the construction of the building structure 12B, one end 60 of the flexible membrane 32 is secured to the wall structure 24A via the membrane connector device 34 in a similar manner as hereinbefore described and as shown in FIG. 11B. The distal second end of the flexible membrane 32, not showing, is attached in like manner to an opposite wall or other support member, and the flexible membrane 32 is caused to extend as a taut membrane plane over the upper flanges of the open web beam 22 and the upper support surface 132 of the support clip 120 as shown. Next, structural bracing member 102 is bolted to each of the roof connector devices 26 secured to the upper end portion 98 of the wall structure 24A and to the inline primary beam 18 via the support clip 120. Next, the base clips 40 of the panel support assemblies 30 are bolted at spaced-apart intervals over the membrane 32 to the underlying secondary structural system 20, such as the underlying open web beam 22. With the base clips 40 secured thusly in place, the panel support beams 48 of the panel support assemblies 30 are then secured to the upper leg portions 46 of the base clips 40 that are in place. The panel support assemblies 30 and the roof connector device 26 are constructed such that in an assembled position the distance the panel support assemblies 30 extend above the supporting secondary structural member, and the distance the roof connector device 26 extends above the wall structure, are substantially equal.

Failures of the base clips 40, when roof panels are secured thereto and a load is placed on the roof panels, can be minimized or prevented by stabilizing both the upper leg portion 46 and lower leg portion 42 of base clips 40. This may be accomplished by using either a combination of wall structural bracing system 90 as herebefore described or a base clip bracing system 140 and stabilizing the underlying secondary structural system as described in my copending patent application Ser. No. 306,662, filed Sept. 29, 1981. Either the base clip bracing system 140 or the wall structural bracing system 90 provides the desired stability to the upper leg portion 46 of base clip 40 by substantially preventing translational and rotational movement of the base clip 40 when the base clip 40 is under load transference condition. While only one base clip 40 and the associated base clip bracing system 140 or wall structural bracing system 90 is illustrated, it should be noted in actual practice one base clip bracing system 140 or wall structural bracing system 90 will stabilize more than one base clip 40. The stability being imparted to adjacent base clips 40 through the stabilizing effect of the roof acting as a single unit to transmit shear, compression or tensile stress from one roof panel 28 to the adjacent roof panel 28 so that once one panel support assembly 30 is braced, the roof panel 28 supports other panel support assemblies 30. This enables the building structure 12 to retain its structural integrity and yet allows roof panel 28 to expand and contract freely and without damaging the roof as temperature changes. The base clips 40 are secured to the open web beam 22 as hereinbefore described, and the panel support beams 48 are then secured to the upper leg portions 46 of the base clips 40.

The clip bracing system 140 comprises a tensile brace 142, such as a strap, having a first end 144, a median portion 146, and an opposed second end 148. As shown in FIG. 11, a support clip 120A is secured to the underlying primary beam 18 a preselected distance from a first side 150 of the open web beam 22; and a support clip 120B is secured to the underlying primary beam 18 a preselected distance from an opposed second side 152 of the open web beam 22. The support clip 120A is provided with a pair of oppositely extensive leg portions (only leg portion 124A being shown) through which self-drilling and self-tapping screws 128A extend to secure the support clip 120A to the underlying primary beam 18. The support clip 120A is also provided with a median portion 130A forming an upper support surface 132A through which self-drilling and self-tapping screws 134A extend to secure the first end 144 of the tensile brace 142 to the support clip 120A.

The support clip 120B is also provided with a pair of oppositely extensive leg portions (only leg portions 124B being shown) through which self-drilling and self-tapping screws 128B extend to secure the support clip 120B to the underlying primary beam 18. The support clip 120B is also provided with a median portion 130B forming an upper support surface 132B through which self-drilling and self-tapping screws 134B extend to secure the opposed second end 148 of the tensile brace 142 to the support clip 120B. Thus, in an assembled portion the support clips 120A and 120B secure the first and opposed second ends 144, 148 of the tensile brace 142 to the primary beam 18 such that the median portion 146 is disposed over the panel support beam 48 of the panel support assemblies 30. The median portion 146 of the tensile brace 142 is secured to the panel support beam 48 by self-drilling and self-tapping screw 154.

Figure 12:
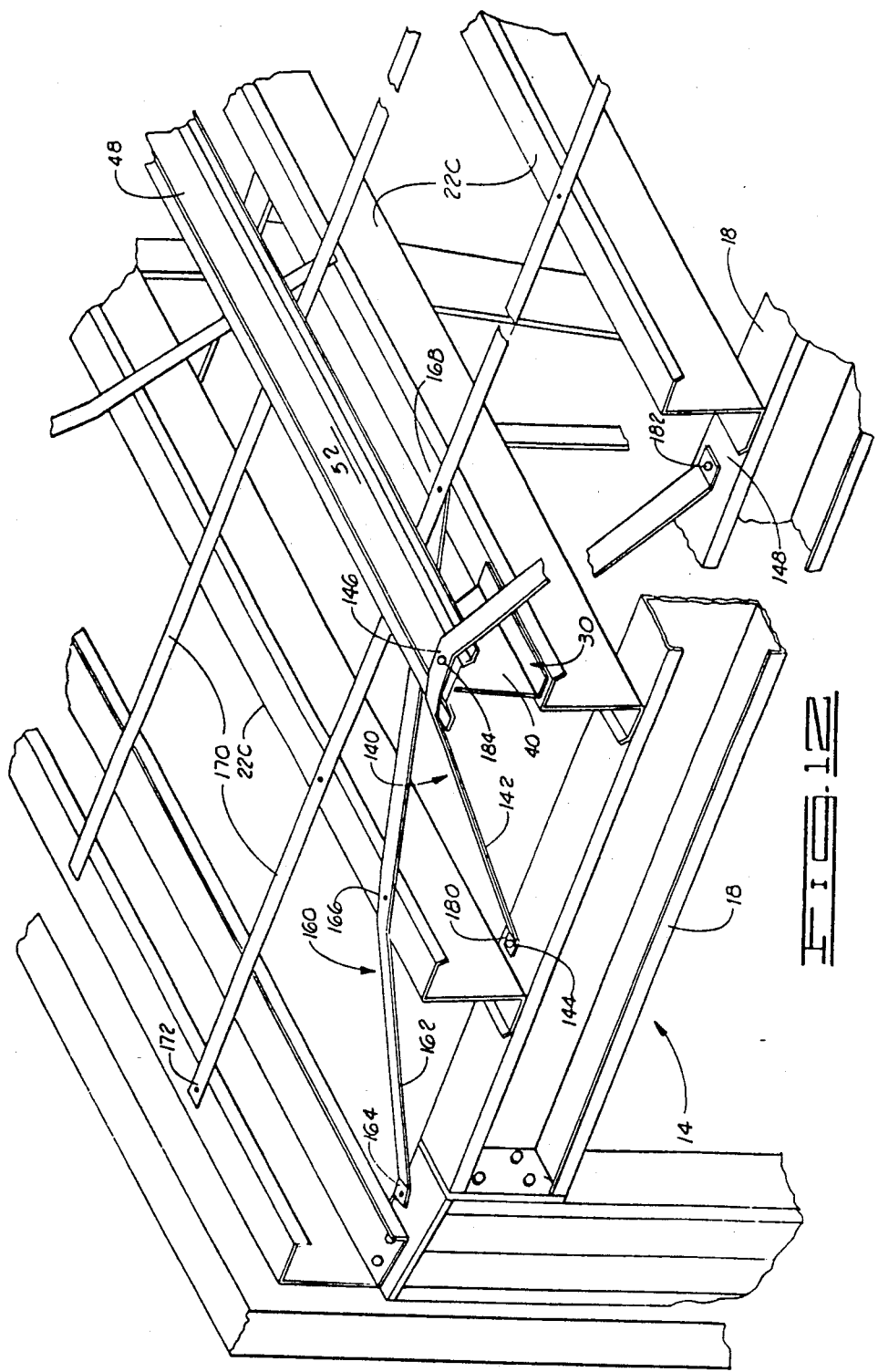
FIG. 12 is an isometric, partial cutaway view of a portion of an insulated roof showing the secondary and tertiary structural bracing system for a pre-engineered building structure constructed in accordance with the present invention.

FIG. 12 shows an embodiment of a secondary structural system 20B comprising a secondary structural member, such as purlins 22C, spanning a single bay; that is, the purlins 22C are supported at the ends thereof by the primary beam 18 of the structural system 14 such that intermediate portions of the purlins 22C overlay the opening between the primary beam 18 of the primary structural system 14. The base clips 40 of the panel support assemblies 30 are secured to purlins 22C as hereinbefore described, and panel support beams 48 are then secured to upper leg portions 46 of base clips 40. In this embodiment base clips 40 are positioned on the purlins 22C such that upon attachment of the panel support beams 48 to the base clips 40 the longitudinal axis of the panel support beams 48 are substantially parallel to the longitudinal axis of the purlins 22C. The stabilization of upper leg portion 46 of base clips 40 at selected locations is achieved via base clip bracing system 140; and stabilization of purlins 22C is achieved via a purlin bracing system 160 as described in my U.S. patent application, Ser. No. 306,662, filed Sept. 29, 1981. The disclosure contained in that application is incorporated herein by reference and will be considered as though in fact described fully herein. By employing base clip bracing system 140 to stabilize one panel support assembly 30, and purlin bracing system 160 to stabilize purlins 22C, the roof panel 28 can expand and contract while at the same time retaining its structural stability, watertightness and insulating ability. Bracing system 140 prevents a domino effect in the building roof resulting from failure of a single panel support assembly 30 and/or a purlin 22C. The purlin bracing system 160 comprises a series of diagonal braces 162 which are tensile straps connected to the primary beam 18, at one end therof and extend obliquely from the primary beam 18 to connect to one or more of the purlins 22C at intermediate portions thereof. (As used herein, the term oblique will mean that the diagonal braces 162 extend from the primary beam 18 at an angle that is not perpendicular.) While this pattern may be repeated at several areas of building roofing system, FIG. 12 shows only one of diagonal braces 162. Diagonal brace 162 is attached to primary beam 18 at juncture point 164, to the first adjacent purlins 22C at juncture point 166, and to the second one of the next adjacent purlins 22C at juncture point 168.

The purpose of diagonal braces 162 is to increase the load-carrying capacity of purlins 22C by restricting the translation and rotation of purlins 22C. This is accomplished by causing load to occur in the diagonal braces 162.

Purlin bracing system 160 also comprises a series of parallel straps 170 which laterally stabilize others of purlins 22C and which attach to diagonal braces 162 in such a manner that load transference is carried therethrough. A first parallel strap 170 is attached to purlin 22C at juncture point 172 and extends substantially parallel to primary beam 18 and substantially perpendicularly to purlins 22C. Additional portions of parallel strap 170 extend in like manner over adjacent purlins 22C and boltingly attached to each purlin 22C over which they pass.

The stabilization of base clips 40 of panel support assemblies 30, which may also be identified as a tertiary structural system, is achieved by base clip bracing system 140 of the present invention.

The first end 144 and opposed second end 148 of tensile brace 142 are secured to primary beam 18 by self-drilling and self-tapping screws 180, 182 such that median portion 146 of tensile brace 142 extends over the panel support surface 52 of panel support beams 48. A self-drilling and self-tapping screw 184 extends through median portion 146 of tensile brace 142 at adjacently disposed portion of the panel support beam 48 for securing tensile braces 142 to panel support beam 48. Once tensile brace 142 has been secured to purlin 22C and panel support beam 48 as described above, roof panels 28A can be secured to panel support beam 48. When employing clip bracing system 140 of the present invention, base clips 40 and panel support beam 48 can be readily stabilized, thus preventing translational and rotational movement of base clips 40 when same is under load transference conditions. Further, when employing flexible membrane 32 and layer of insulation 36 in the construction of the building structure, such components are secured and positioned as hereinbefore described in detail.

It is clear that the present invention is well-adapted to carry out the objects and to attain the ends and advantages mentioned therein. While presently preferred embodiments of the invention have been described for purposes of this disclosure, numerous changes may be made which will readily suggest themselves to those skilled in the art and which are encompassed within the spirit of the invention disclosed and as defined in the appended claims.

I claim:

1. An improved roof clip assembly for attaching a longitudinally extensive roof panel to an underlying secondary structrual member of a building, the roof clip assembly comprising:
    a base clip having a lower end, a median portion, and an upper end;
    a pair of oppositely extensive lower leg portions formed at the lower end of the base clip and secured to the secondary structural member such that the median portion of the base clip is planarly extensive normal to the longitudinal axis of the roof panel; and
    a pair of oppositely extensive upper leg portions formed at the upper end of the base clip for supporting the roof panel so that longitudinal movement of the roof panel flexes the median portion of the base clip within the elastic limits of the median portion.

2. A building assembly comprising:
    a primary structure;
    a plurality of spatially disposed secondary structural members supported by the primary structure;
    a plurality of spatially disposed tertiary structural members supported by the secondary structural members;
    a roof structure;
    a wall structure;
    roof connector means for interconnecting the roof structure to the wall structure; and
    wall structural bracing means for interconnecting the roof connector means to the primary structure, the wall bracing means comprising a wall structural brace member having a first end portion, a median portion and an opposed second end portion, the first end portion being connected to the roof connector means, and the opposed second end portion being connected to the primary structure such that the median portion of the wall structural bracing member depends in a downward direction from connection to the roof connector means and stabilizes the roof structure in relation to the primary structure.

3. An improved roof assembly supported by underlying building structural members, comprising:
    a plurality of longitudinally extending roof panel members;
    a plurality of panel support beams;
    panel clip means supported by the panel support beams, for attaching the roof panels to the panel support beams; and
    a plurality of base clips attached to the underlying building structural members and supportingly attached to the panel support beams, each base clip having a web portion planarly extensive normal to the longitudinal axes of the roof panels, the base clips securedly interconnecting between the panel support beams and the building structural members so that longitudinal movement of the roof panels causes the web portions of the base clips to flex in the direction of said longitudinal movement, the flexing of said web portions accommodating said longitudinal movement of the roof panel members within the elastic limit of the web portions.

4. The building assembly of claim 3 wherein the bracing means comprises a load transfer strap interconnecting the selected tertiary support members to at least one adjacently disposed position on the primary structure, the adjacently disposed position being located a selected distance from the tertiary support member.

5. The building assembly of claim 3 wherein the first bracing means is a strap member having a first end portion, a median portion and a opposed second end portion, and wherein the building assembly further comprises:
    support clip means secured to the underlying primary structure for connecting the first end and opposed second end portions of the strap member to the primary structure such that the median portion of the strap member extends over and connected to this tertiary support member.

6. The building assembly of claim 5 wherein the secondary structural members are open web beams.

7. The building assembly of claim 5 wherein the support clip means comprises:
a pair of oppositely disposed leg portions and a median portion having an upper support surface for receiving one of the first and opposed second end portions of the strap member, the oppositely disposed leg portions being adapted to receive connector members for securing same to the primary structure.

8. The building assembly of claim 7 where the median portion of the support clip extends upwardly from the primary structure a distance substantially equal to the distance the secondary structural member extends upwardly from the primary structure.

9. The building assembly of claim 2 wherein the roof connector means is connected to an upper portion of the wall structure so as to extend a selected distance above the wall structure, the tertiary structural members are secured to the secondary structural members so as to extend a selected distance above the secondary structural members, and the distance the roof connector means extends above the wall structure and the tertiary structural members extend above the secondary structural members is substantially equal.

10. The building assembly of claim 2 wherein the roof connector means is an eave-Zee, and the roof structure is constructed so as to transmit shear, tensil or compressive force from one location point on the roof structure to a second location point on the roof structure.

11. A building assembly comprising:
a primary structure;
a plurality of spatially disposed secondary structural members supported by the primary structure;
a plurality of spatially disposed tertiary structural members supported by the secondary structural members;
a roof structure;
a wall structure;
roof connector means for interconnecting the roof structure to the wall structure;
wall structural bracing means for interconnecting the roof connector means to the primary structure so as to stabilize one longitudinal point of the roof structure in relation to the primary structure;
a flexible membrane having a first end and a second end, the flexible membrane being disposed over the secondary structural members in a direction susbtantially normal to the elongated axes of the secondary structural members;
first membrane attaching means for attaching the membrane to the primary structure such that the membrane extends substantially taut therebetween; and
second membrane attaching means for attaching the membrane to at least one of the secondary structural members to increase the load carrying capacity of the secondary structural members by restricting the translation and rotation of the secondary structural members.

12. The building assembly of claim 11 wherein the roof structure comprises:
longitudinally extensive roof panel members supported by the secondary structural members.

13. The building assembly of claim 12 wherein the tertiary support members are positioned on the flexible membrane such that the tertiary support members extend between the roof panel members and the secondary structural members.

14. The building assembly of claim 13 wherein each of the tertiary support members comprises:
base clip having a lower end and a median portion, the lower end being secured to the secondary structural member such that the web portion of the base clip is planarly extensive normal to the longitudinal axis of the roof panel member so that longitudinal movement of the roof panel member flexes the web portion of the base clip within the elastic limits of the web portion.

15. The building assembly of claim 14 wherein the base clip has an upper end, and the tertiary support member further comprises:
at least one lower leg portion formed at the lower end of the base clip.

16. The building assembly of claim 14 wherein the base clip has an upper end, and the tertiary support member further comprises:
at least one upper leg portion formed at the upper end of the base clip.

17. The building assembly of claim 14 wherein the base clip has an upper end, and the tertiary support member further comprises:
a pair of oppositely extensive lower leg portions formed at the lower end of the base clip and a pair of oppositely extensive upper leg portions formed at the upper end of the base clip.

18. The building assembly of claim 14 wherein the tertiary support member further comprises:
at least one panel support beam supported by the base clip, the panel support beam supporting at least a portion of the roof panel.

19. The building assembly of claim 11 wherein the frst membrane attaching means comprises:
a first membrane connector secured to a first wall structure of the building assembly, the first membrane connector grippingly engaging a first end portion of the flexible membrane; and
a second membrane connector secured to an oppositely disposed second wall structure of the building assembly, the second membrane connector grippingly engaging a second end portion of the flexible membrane such that the flexible membrane extends tautly over the secondary structural members.

20. The building of claim 11 wherein the second membrane attaching means comprises a plurality of connectors for interconnecting the tertiary support members, an adjacently disposed portion of the secondary structural member, and a portion of the flexible membrane disposed therebetween.

21. The building assembly of claim 11 wherein the flexible membrane is formed of a plurality of adjacently disposed membrane members wherein edge portions of adjacently disposed members are overlapped and sealed form a substantially continuous surface.

22. The building assembly of claim 21 wherein the flexible membrane is selectively positioned to provide a slope substantially corresponding to a slope of the roof panel members such that water or condensate collecting on the flexible membrane is caused to drain to a lower edge of a roof slope formed by the roof panel members.

23. The building assembly of claim 22 further comprising:
drain means for establishing fluid communication between an upper surface of the flexible membrane and an exterior of the building assembly so that water or condensate collected on the upper surface of the flexible membrane can be drained to the exterior of the building assembly.

24. A building assembly comprising:
a primary structure;
a plurality of spatially disposed secondary structural members supported by the primary structure;
a plurality of spatially disposed tertiary structural members supported by the secondary structural members;
a roof structure supported by the tertiary structural members; and
structural bracing means for interconnecting the roof structure to the primary structure so as to stabilize the roof structure in relation to the primary structure, the structural bracing means connected to at least some of the tertiary support members for increasing the load carrying caoacity of the tertiary support members by substantially restricting the translation and rotation of the tertiary support members while permitting other tertiary support members to flex and accommodate the longitudinal movement of the roof panel means within the elastic limit of the teritary support members.

25. A building assembly comprising:
a primary structure;
a plurality of secondary structural members, each of the secondary structural members having a first and a second end, the secondary structural members being supported at their respective first and second ends by the primary structure;
a flexible membrane having a first end and a second end, the flexible membrane being disposed over the secondary structural members in a direction substantially normal to the elongated axes of the secondary structural members;
first membrane attaching means for attaching the membrane to the primary structure such that the membrane extends substantially taut therebetween; and
second membrane attaching means for attaching the membrane to at least one of the secondary structural members to increase the load carry capacity of the secondary structural members by restricting the translation and rotation of the secondary structural members.

26. The building assembly of claim 25 further comprising:
longitudinally extensive roof panel means supported by the secondary structural members for forming a roof for the building assembly.

27. The building assembly of claim 26 further comprising:
tertiary support means for securing the roof panel means to the secondary structural members, the tertiary support means being positioned on the flexible membrane such that the tertiary support means is disposed between the roof panel means and the secondary structural members, for transferring load from the roof panel members to the primary structure via the secondary structural members.

28. The building assembly of claim 27 wherein the tertiary support means comprises:
a base clip having a lower end and a median portion, the lower end being secured to the secondary structural member such that the web portion of the base clip is planarly extensive normal to the longitudinal axis of the roof panel so that longitudinal movement of the roof panel flexes the web portion of the base clip within the elastic limits of the web poriton.

29. The building assembly of claim 27 wherein the base clip has an upper end, and the tertiary support means further comprises:
at least one lower leg portion formed at the lower end of the base clip.

30. The building assembly of claim 27 wherein the base clip has an upper end, and the tertiary support means further comprises:
at least one upper leg portion formed at the upper end of the base clip.

31. The building assembly of claim 27 wherein the base clip has an upper end, and the tertiary support means further comprises:
a pair of oppositely extensive lower leg portions formed at the lower end of the base clip and a pair of oppositely extensive upper leg portions formed at the upper end of the base clip.

32. The building assembly of claim 27 wherein the tertiary support means further comprises:
at least one panel support beam supported by the base clip, the panel support beam supporting at least a portion of the roof panel.

33. The building assembly of claim 27 wherein the tertiary support means further comprises:
first bracing means, connected to the primary structural member and extending over a portion of the tertiary support means at a location representing a point of affixation of the roof panel to the primary structure, for increasing the load carry capacity of the tertiary support means by substantially restricting the translation and rotation of the tertiary support means while permitting other tertiary support means to flex and accommodate the longitudinal movement of the roof panel means within the elastic limit of the tertiary support means.

34. The building assembly of claim 33 wherein the first bracing means comprises a load transfer strap interconnecting the selected tertiary support means to at least one adjacently disposed position on the primary structure, the adjacently disposed position being located a selected distance from the tertiary support means.

35. The building assembly of claim 27 wherein the first membrane attaching means comprises:
a first membrane connector secured to a first side of the building assembly, the first membrane connector grippingly engaging a first end portion of the flexible membrane; and
a second membrane connector secured to an oppositely disposed second side of the building assembly, the second membrane connector grippingly engaging a second end portion of the flexible membrane such that the flexible membrane extends tautly over the secondary structural members.

36. The building of claim 27 wherein the second membrane attaching means comprises a plurality of connectors for interconnecting the tertiary support means, an adjacently disposed portion of the secondary structural member, and a portion of the flexible membrane disposed therebetween.

37. The building assembly of claim 36 wherein the flexible membrane is formed of a plurality of adjacently disposed membrane members wherein edge portions of adjacently disposed members are overlapped and sealed to form a substantially continuous surface.

38. The building assembly of claim 25 wherein the flexible membrane is selectively positioned to provide a slope substantially corresponding to a slope of the roof panel members such that water or condensate collecting on the flexible membrane is caused to drain to a lower edge of a roof slope formed by the roof panel members.

39. The building assembly of claim 38 further comprising:
drain means for establishing fluid communication between an upper surface of the flexible membrane and an exterior of the building assembly so that water or condensate collected on the upper surface of the flexible membrane can be drained to the exterior of the building assembly.

* * * * *

UNITED STATES PATENT AND TRADEMARK OFFICE
CERTIFICATE OF CORRECTION

PATENT NO. : 4,602,468

DATED : July 29, 1986

INVENTOR(S) : Harold G. Simpson

It is certified that error appears in the above-identified patent and that said Letters Patent is hereby corrected as shown below:

In claim 2, column 20, line 14, the word "intcrconnecting" should read --interconnecting--. In claim 4, column 20, line 50, reading "the brac-" should read --the first brac- --. In claim 11, column 21, line 47, the word "susb-" should read --subs- --. In claim 19, column 22, line 33, the word "frst" should read --first--. In claim 24, column 23, line 17 the word "caoacity" should read --capacity--. In the ABSTRACT, line 12, the word "if" should read --of--.

Signed and Sealed this

Twenty-fifth Day of November, 1986

*Attest:*

DONALD J. QUIGG

*Attesting Officer*   *Commissioner of Patents and Trademarks*